United States Patent
Carrier

(10) Patent No.: US 8,055,996 B2
(45) Date of Patent: Nov. 8, 2011

(54) LIGHTWEIGHT FORM PATTERN VALIDATION

(75) Inventor: Scott Carrier, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 1423 days.

(21) Appl. No.: 10/712,544

(22) Filed: Nov. 13, 2003

(65) Prior Publication Data

US 2005/0108624 A1  May 19, 2005

(51) Int. Cl.
G06F 17/00 (2006.01)
(52) U.S. Cl. .......................... 715/221; 715/237
(58) Field of Classification Search .............. 715/505, 715/221–225, 200, 237; 717/136
See application file for complete search history.

(56) References Cited

U.S. PATENT DOCUMENTS

| | | | |
|---|---|---|---|
| 6,292,827 B1* | 9/2001 | Raz | 709/217 |
| 6,553,412 B1 | 4/2003 | Kloba et al. | |
| 6,823,504 B1* | 11/2004 | Sokolov | 717/136 |
| 7,240,279 B1* | 7/2007 | Chartier et al. | 715/513 |
| 2002/0065800 A1 | 5/2002 | Morlitz | |
| 2002/0083132 A1 | 6/2002 | Holland et al. | |
| 2002/0161826 A1 | 10/2002 | Arteaga et al. | |
| 2002/0188761 A1 | 12/2002 | Chikirivao et al. | |
| 2002/0198935 A1* | 12/2002 | Crandall et al. | 709/203 |
| 2003/0045316 A1 | 3/2003 | Tjong et al. | |
| 2003/0056207 A1 | 3/2003 | Fischer et al. | |
| 2003/0078949 A1* | 4/2003 | Scholz et al. | 707/505 |
| 2005/0028084 A1* | 2/2005 | Dziejma | 715/505 |

OTHER PUBLICATIONS

Brill, G., "Code Notes for ASP.NET," Random House, Inc., 2002, cover, copyright page, and Chapter 5 (pp. 115-149).*
Tsachev, M., "Form Validation on the Client Side," Sitepoint article, Sep. 8, 2002, pp. 1-5.*
Lemay, W., "Wilma Lemay's JavaScript," Sams.net Publishing, 1996, cover, copyright page, and pp. 132-137.*
Robertsson, An introduction to schematron, Nov. 12, 2003, XML.com, pp. 1-10.*
Ogbuji, Validating XML with schematron, Nov. 22, 2000, xml.com, pp. 1-6.*
Jelliffe, The schematron assertion language 1.6, Oct. 1, 2002, pp. 1-32.*
Kratky et al., Apply Schematron constraints to Xforms documents automatically, Jun. 27, 2006, IBM, pp. 1-9.*
Anonymous Author, *JavaScript—The Workhorse of the Web, 2003,*, Tutorial, *DCD Designs*, (visited Nov. 5, 2003) <http://www.dcdesigns.com/servlet/PageServer?pageName=Javascript-Tutorial>.

(Continued)

*Primary Examiner* — Stephen Hong
*Assistant Examiner* — Manglesh Patel
(74) *Attorney, Agent, or Firm* — Steven M. Greenberg, Esq.; Carey, Rodriguez, Greenberg & Paul

(57) ABSTRACT

A pattern validation method can include retrieving a value for a form based input field from a form defined in markup rendered in a content browser. The retrieved value along with a validation pattern for the form based input field can be passed to a validation process disposed within a lightweight validation library coupled to the rendered markup. Subsequently, the retrieved value can be validated in the content browser according to the validation pattern. Notably, each step of retrieving, passing and validating can be repeated for at least one additional value for at least one additional form based input field disposed in the markup rendered in the content browser. In this regard, the retrieving, passing, and validating steps can be performed in a validation shell function disposed in the markup rendered in the content browser.

4 Claims, 3 Drawing Sheets

OTHER PUBLICATIONS

Turner, J., *Conformance Levels in XForms*, Message, pp. 1-2 (visited Nov. 5, 2003) <http://lists.w3.org/Archives/Public/www-forms-editor/2002Jan/0031.html>.

Anonymous Author, *XForms Processors*, Tutorial, *Orberon, Inc.*, 2003, pp. 1-5, (visited Nov. 5, 2003) <http://www.orbeon.com/oxf/doc/processors-xforms>.

Anonymous Author, *Validation Processor*, Tutorial, *Orberon, Inc.*, 2003, pp. 1-2, (visited Nov. 5, 2003) <http://www.orbeon.com/oxf/doc/processors-validation>.

Anonymous Author, *Introduction to XForms*, Tutorial, *Refsnes Data*, 2003 (visited Nov. 5, 2003) <http://www.w3schools.com/xforms/xforms_intro.asp>.

Anonymous Author, *Validating Data Entry with JavaScript*, *SilverStream Software, Inc.*, 2002, pp. 1-5 (visited Nov. 5, 2003) <http://www.novel.com/documentation/lg/extendas35/docs/help/books/TechFormValidation.html>.

\* cited by examiner

LIGHTWEIGHT FORM PATTERN VALIDATION

BACKGROUND OF THE INVENTION

1. Statement of the Technical Field

The present invention relates to the distribution of form-based input screens, and more particularly to the client-side validation of pattern conformity for form-based input provided through a distributed form.

2. Description of the Related Art

Form based input is the enabling technology which permits the widespread distribution of applications across generic client platforms such as the conventional content browser. In the prototypical distributed application, a markup language defined interface can form the principal conduit through which end users can interact with backend application logic. Often configured in the form of a Web page, the interface can be provided to the content browser by a content server and can take the form either of a pre-defined static page, or a dynamically generated page. Form input fields can be positioned within the interface through which user input can be accepted and posted to the backend application logic for further processing.

As in the case of any application, regardless of its mode of distribution, oftentimes, validation will be required for each input field in a form defined within an interface in which the end user can provide ad hoc input. Examples of input fields which might require validation can include free-form text input fields in which the end user is free to provide any time of input able to provided within the field. As the application logic may expect input of a particular format or pattern, however, validation will be required. In this regard, pattern validation refers to the inspection of user input to ensure that the input conforms to a particular pattern. Examples include date formats, time formats, credit card number formats, address formats, telephone number formats and the like.

Within the context of hypertext markup language (HTML) documents, it is well known to incorporate pattern validation within the interface. Specifically, to ensure that form based input comports with a particular pattern, some have incorporated simplistic programmatic scripts within the markup language document in which the pattern utilized to validate a form input field has been hard coded in the script. Upon the submission of form based input in the markup language document, the script can be executed to validate that the form input has a format which matches the pattern hard coded within the embedded script.

Despite the flexibility afforded by script based pattern validation within HTML defined forms, HTML defined forms mix data, logic and presentation in contravention of standard programming practices. In this regard, the well-known model-view-controller paradigm demands that each of data, logic presentation remain separable. In this way, though the presentation layer may change to suit the user interface requirements of an end user, the underlying logic layer need not also change. To accommodate the increasing complexity of transactions conducted through forms, the XForms specification has been proposed as a presentation independent way of handling interactive Web transactions. Significantly, the XForms specification separates data and logic from presentation in that XForms utilizes the extensible markup language (XML) for data transport and HTML for data display.

Advantageously, in the conventional XForms implementation, pattern validation can be implemented using heavyweight Javascript libraries at the client side. Implementing client-side pattern validation can be important because in many circumstances it is desirable to validate form input without requiring a transaction between client and server. Yet, to accomplish the pattern validation of XForms, one must deploy a heavyweight Javascript validation library at the client. Where the client is a fixed, desktop unit enjoying substantial resources, hosting a heavyweight library will be of no consequence. The same cannot be said, however, of the resource limited client such as a mobile device.

Mobile device clients differ from conventional computing clients in that less computing resources are available for use by any client side logic and also in that a communicative link to backend application logic will not always remain available. Given both constraints associated with mobile device clients, it will be preferable to validate form based input prior to submitting the form based input to the backend application logic. Yet, to date pattern validation in the mobile device client strictly has been limited to server side validation primarily because mobile device clients lack the resources required to host a heavyweight validation library.

SUMMARY OF THE INVENTION

The present invention addresses the deficiencies of the art in respect to forms based processing of input and provides a novel and non-obvious method, system and apparatus for lightweight pattern based validation of forms based input in a distributed form. In accordance with the present invention, a lightweight pattern validation system can include a validation processor configured with a prototype interface for receiving both a field validation pattern and also form based input to be validated against the field validation pattern. The system further can include a validation script library packaging the validation process.

Notably, a library reference to the script library can be disposed within markup defining a form. In particular, the form can have at least one form based input field programmed for validation using the validation processor. A function call to the validation processor further can be disposed in the markup. The function call can have a configuration for passing a reference to a value in the form based input field for validation in the validation processor. Preferably, additional function calls to the validation processor can be disposed in the markup. As such, each additional one of the functional calls can have a configuration for passing a reference to a value in a corresponding form based input field for validation in the validation processor. In each case, however, a validation shell function can encapsulate the function call or calls.

A pattern validation method also is contemplated within the scope fo teh present invention. In a preferred aspect of the invention, a pattern validation method can include retrieving a value for a form based input field from a form defined in markup rendered in a content browser. The retrieved value along with a validation pattern for the form based input field can be passed to a validation process disposed within a lightweight validation library coupled to the rendered markup. Subsequently, the retrieved value can be validated in the content browser according to the validation pattern. Notably, each step of retrieving, passing and validating can be repeated for at least one additional value for at least one additional form based input field disposed in the markup rendered in the content browser. In this regard, the retrieving, passing, and validating steps can be performed in a validation shell function disposed in the markup rendered in the content browser.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for the pattern validation of forms based input in a distributed form. In accordance with the present invention a value for a form based input field can be retrieved from a form defined in markup rendered in a content browser. The retrieved value along with a validation pattern for the form based input field can be passed to a validation process disposed within a lightweight validation library coupled to the rendered markup. Subsequently, the retrieved value can be validated in the content browser according to the validation pattern. Notably, the retrieval, passage and validation can be repeated for at least one additional value for at least one additional form based input field disposed in the markup rendered in the content browser.

Figure 1:
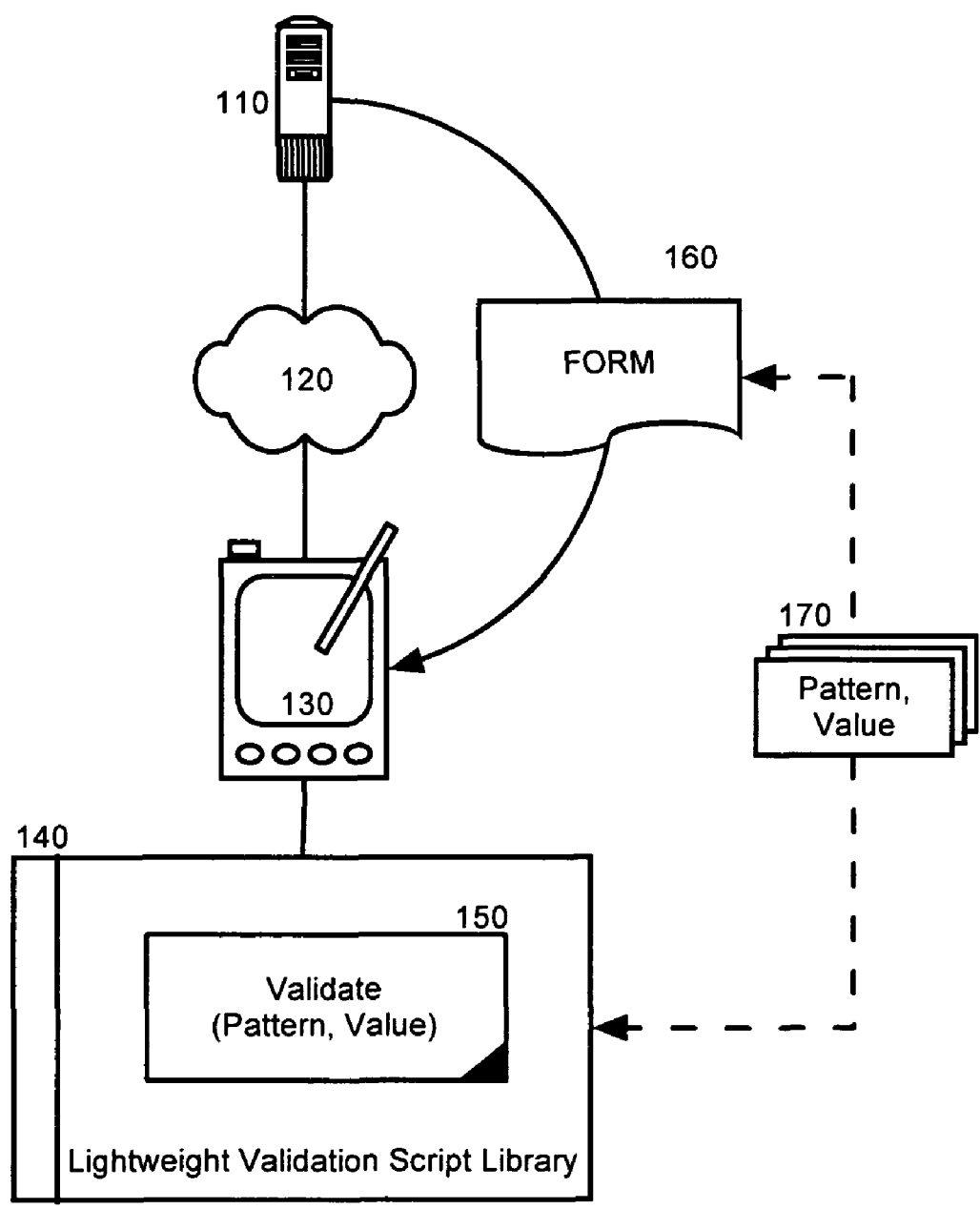
FIG. 1 is pictorial illustration of a pattern validation system which has been configured in accordance with the present invention.

FIG. 1 is pictorial illustration of a pattern validation system which has been configured in accordance with the present invention. As shown in FIG. 1, a form 160 can be defined within a markup language document disposed within a content server 110. The content server 110 can be communicatively coupled to one or more client devices 130 over the computer communications network 120. Though only a single client computing device 130 has been shown for simplicity of illustration, the skilled artisan will recognize that a multiplicity of computing clients can be coupled to the content server 110 which can range from fully functional, robust personal computers to limited function, mobile devices including cellular telephones and personal digital assistants.

A pattern validation processor 150 can be defined to validate user input against a defined pattern as is known in the art of XForm pattern validation. Specifically, the pattern validation processor 150 can expose a prototype interface through which a specific pattern and a value can be provided to the routine for processing. The routine defined within the pattern validation processor 150 can parse the value to ensure that the value has a format which matches the specific pattern. Where the value matches the specific pattern, the routine can return an indication as such. Conversely, where the value does not match the specific pattern, the routine similarly can return a failing indication. Importantly, the pattern validation processor 150 can be packaged within a script library 140. Preferably, the pattern validation processor 150 can be the only routine disposed within the script library 140 such that the script library 140 can be viewed as lightweight.

In operation, when one or more input fields defined within the form 160 have been rendered in a content browser operating within the client computing device 130, one can interact with the input fields, providing values for the input fields as required. When the end user chooses to submit the form for processing based upon the values provided for the input fields, each value can be passed to the validation processor 150 as can a corresponding pattern for which the value must comport. The validation processor 150 in turn can confirm or reject the value allowing for the form to properly handle the invalidation event. Notably, all of the foregoing process can be performed in the client computing device 130 and not in the server computing device 110. Moreover, as the validation processor 150 can be packaged within a lightweight validation script library 140, there will be no need to cache a complete copy of a conventional script library thus permitting the lightweight validation script library 140 to remain resident in the client computing device 130—even where the resources of the client computing device 130 are limited.

Figure 2:
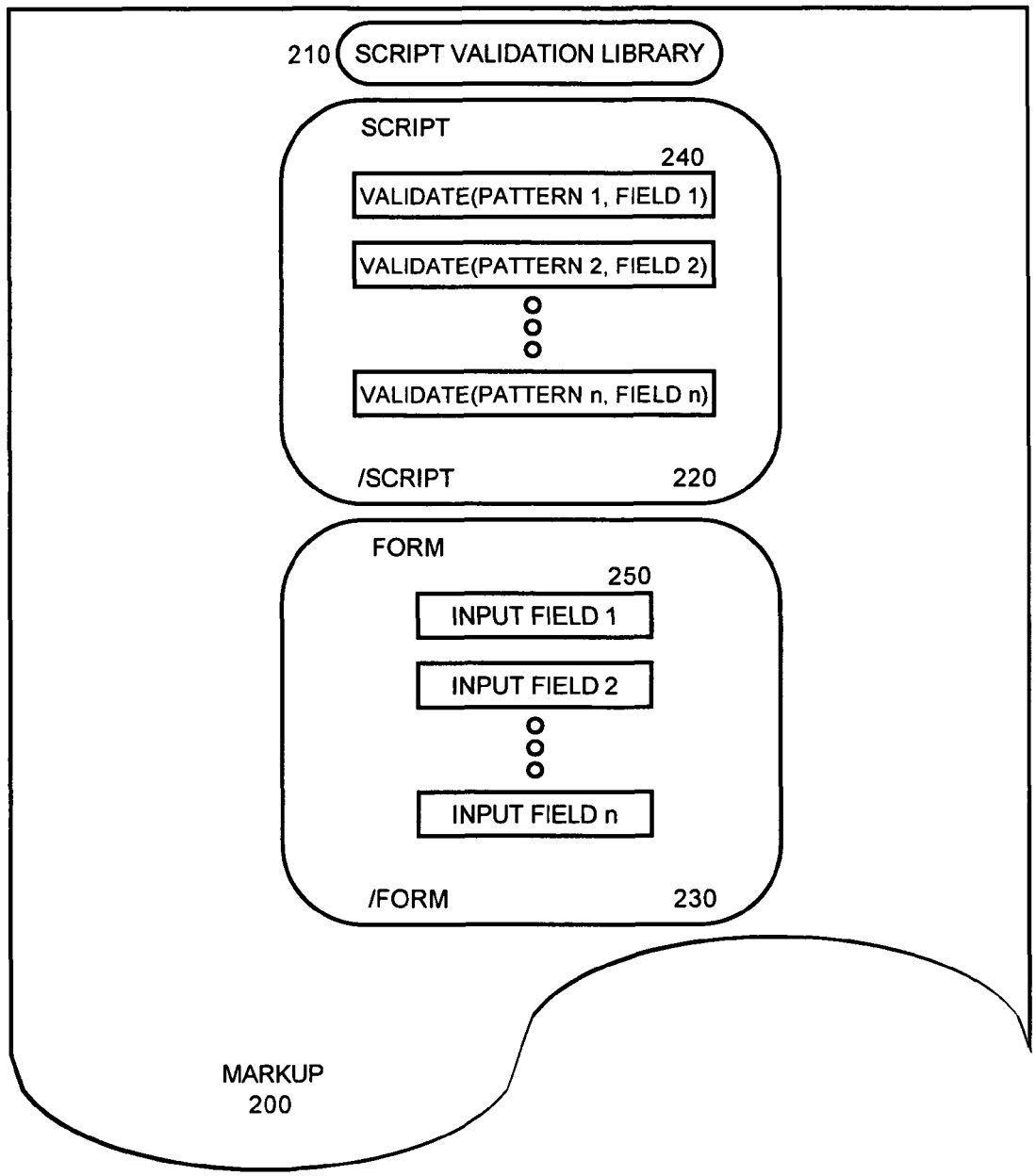
FIG. 2 is a schematic diagram of a markup language document which has been configured for use in the system of FIG. 1; and, FIG. 3 is a flow chart illustrating a process for lightweight, client side pattern validation.

FIG. 2 is a schematic diagram of a markup language document which has been configured for use in the system of FIG. 1. In accordance with the present invention, a markup language document 200 can be configured with a form 230. The form 230 can define one or more input fields 250 in which user input can be provided. The input fields 250 can be defined such that validation will be required prior to submitting provided values in the input fields 250 to back end application logic. To avoid performing validation in the server, however, the validation can be performed inline in association with the markup language document 200.

In this regard, a reference 210 to a lightweight script validation library can be disposed within the markup language document 200. The lightweight script validation library itself can include a validation process which can assert compliance between a provided value and a provided pattern. In this way, the library can remain generic and flexible, yet small in size and resource requirements such that the library can be deployed in resource limited devices. Most importantly, the size of the library need not change regardless of the number of patterns provided against which values in the form 230 are to be validated.

In any case, a script 220 can be disposed within the markup language document 200 in which selected ones of the input fields can be coupled to individual function calls 240 to the validation process in the script validation library. Each individual one of the function calls 240 can include a value for the corresponding form based input field, and a pattern against which the value is to be evaluated. The script 220 itself can be activated upon the triggering of an event in which the values are to be submitted over the computer communications network for further processing.

Figure 3:
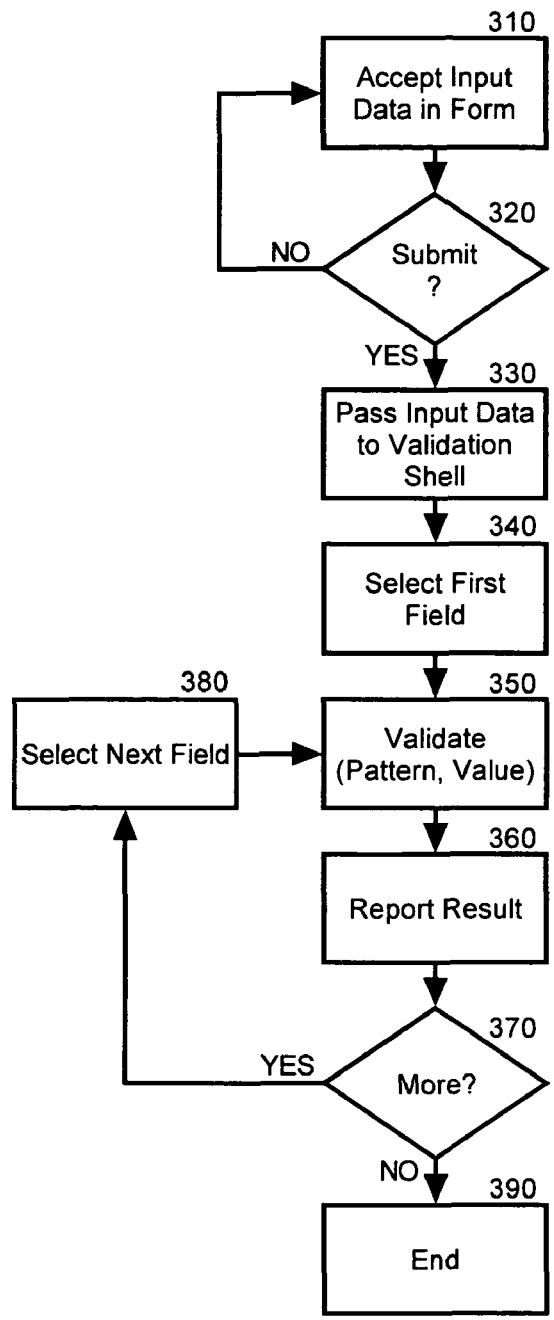

In further illustration of the foregoing process, FIG. 3 is a flow chart illustrating a method for lightweight, client side pattern validation. Beginning in block 310, input data can be accepted in a markup language defined form. In decision block 320, it can be determined whether the input data is to be submitted for processing. Once the data is determined to be submitted for processing, in block 330 the input data provided in selected ones of the input fields can be passed to a validation shell. The validation shell can be a single function defined within the markup language document in which multiple pattern validation operations for corresponding multiple input fields can be processed within a single function call.

In this regard, in block 340 the first input field can be selected for processing and in block 350, the pattern validation process can be invoked while passing into the pattern validation process two parameters: the value of the input field and a pattern against which the input field is to be tested. In block 360 the result of the pattern validation process can be received and reported within the validation shell. Notably, the reported result can be handled in countless ways ranging from a mere textual indication that the value for the particular input field failed to validate, to the invocation of a help-specific function. In any case, in decision block 370 if more input fields remain to be tested, in block 380 the next input field can be selected and subsequently processed in blocks 350 through 370. Finally, in block 390 the process can end.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A lightweight pattern validation system for a client device receiving markup defining a form, comprising:
    a processor said processor further comprising:
    a validation processor separate from said markup and configured with a prototype interface for receiving both a field validation pattern and also form based input to be validated against said field validation pattern;
    a validation script library within said client device and packaging said validation processor, wherein the form has at least one form based input field programmed for validation using said validation processor:
    a library reference to said script library disposed in said markup;
    a function call to said validation processor further disposed in said markup, said function call having a configuration for passing a reference to a value in said at least one form based input field for validation in said validation processor:
    a plurality of additional function calls to said validation processor disposed in said markup, each additional one of said functional calls having a configuration for passing a reference to a value in a corresponding form based input field for validation in said validation processor: and
    a validation shell function encapsulating said function calls.

2. The system of claim 1, wherein the client device is a pervasive device.

3. A pattern validation method comprising the steps of:
    retrieving a value for a form based input field from a form defined in markup rendered in a content browser;
    passing said retrieved value along with a validation pattern for said form based input field to a validation process disposed within a lightweight validation library separate from and coupled to said rendered markup;
    validating said retrieved value according to said validation pattern in said content browser;
    repeating said retrieving, passing and validating steps for at least one additional value for at least one additional form based input field disposed in said markup rendered in said content browser; and
    performing said retrieving, passing, validating and repeating steps in a validation shell function disposed in said markup rendered in said content browser.

4. A machine readable storage having stored thereon a computer program for pattern validation, the computer program comprising a routine set of instructions which when executed by the machine cause the machine to perform the steps of:
    retrieving a value for a form based input field from a form defined in markup rendered in a content browser;
    passing said retrieved value along with a validation pattern for said form based input field to a validation process disposed within a lightweight validation library separate from and coupled to said rendered markup;
    validating said retrieved value according to said validation pattern in said content browser;
    repeating said retrieving, passing and validating steps for at least one additional value for at least one additional form based input field disposed in said markup rendered in said content browser; and
    performing said retrieving, passing, validating and repeating steps in a validation shell function disposed in said markup rendered in said content browser.

* * * * *